United States Patent
Sung et al.

(10) Patent No.: US 9,407,899 B2
(45) Date of Patent: Aug. 2, 2016

(54) METHOD FOR TRANSFORMING FRAME FORMAT AND APPARATUS USING SAME METHOD

(75) Inventors: Jaewon Sung, Seoul (KR); Seungwook Park, Seoul (KR); Jaehyun Lim, Seoul (KR); Jungsun Kim, Seoul (KR); Joonyoung Park, Seoul (KR); Younghee Choi, Seoul (KR); Byeong Moon Jeon, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 13/885,461

(22) PCT Filed: Nov. 15, 2011

(86) PCT No.: PCT/KR2011/008694
§ 371 (c)(1),
(2), (4) Date: May 15, 2013

(87) PCT Pub. No.: WO2012/067399
PCT Pub. Date: May 24, 2012

(65) Prior Publication Data
US 2013/0242049 A1    Sep. 19, 2013

Related U.S. Application Data

(60) Provisional application No. 61/413,482, filed on Nov. 15, 2010, provisional application No. 61/420,755, filed on Dec. 7, 2010.

(51) Int. Cl.
*H04N 15/00*    (2006.01)
*H04N 13/00*    (2006.01)

(52) U.S. Cl.
CPC ...... *H04N 13/0048* (2013.01); *H04N 2213/005* (2013.01)

(58) Field of Classification Search
USPC ........... 348/43, 44, 42, 48, 14.13, 382, 393.1, 348/394.1, 395.1, 398.1, 402.1, 413.1, 348/416.1, 420.1, 439.1, 455, 469, 490, 348/513, 568, 608, 620, 633, 682; 375/375.01, 375.19, 375.12, 375.16, 375/375.4, 240.01, 240.02, 240.04, 240.05, 375/240.06, 240.08, 24.16, 240.21, 240.24, 375/240.26, 293; 382/232, 294; 345/426, 345/166, 419, 582, 597, 600, 653
See application file for complete search history.

(56) References Cited

U.S. PATENT DOCUMENTS 5,947,823 A * 9/1999 Nimura ........................ 463/32
6,055,012 A * 4/2000 Haskell et al. ............... 348/48

(Continued)

FOREIGN PATENT DOCUMENTS

| CN | 1816153 A | 8/2006 |
|---|---|---|
| JP | 2000-023198 A | 1/2000 |

(Continued)

OTHER PUBLICATIONS

Japanese Office Action dated May 13, 2014 for Application No. 2013-538663, 3 pages.

(Continued)

*Primary Examiner* — Jefferey Harold
*Assistant Examiner* — Mustafizur Rahman
(74) *Attorney, Agent, or Firm* — Fish & Richardson P.C.

(57) ABSTRACT

Disclosed are a method for converting a frame format and an apparatus using the same. The method may include: decoding an encoded multiview video compression (MVC)-compatible frame using an MVC decoder; and converting the decoded MVC-compatible frame into an advanced 3D frame. Accordingly, a different frame format may be played by an existing image processing device.

10 Claims, 11 Drawing Sheets

(56) References Cited

U.S. PATENT DOCUMENTS

| | | | |
|---|---|---|---|
| 6,100,895 A * | 8/2000 | Miura et al. | 345/426 |
| 8,548,263 B2 * | 10/2013 | Ergan | G06F 17/30899 382/232 |
| 9,100,659 B2 * | 8/2015 | Pandit et al. | |
| 2006/0177123 A1 | 8/2006 | Ha | |
| 2006/0262856 A1 * | 11/2006 | Wu et al. | 375/240.19 |
| 2007/0121722 A1 * | 5/2007 | Martinian et al. | 375/240.12 |
| 2008/0043095 A1 | 2/2008 | Vetro et al. | |
| 2009/0148054 A1 * | 6/2009 | Kim et al. | 382/232 |
| 2009/0219985 A1 * | 9/2009 | Swaminathan et al. | 375/240.01 |
| 2009/0225846 A1 * | 9/2009 | Francois et al. | 375/240.16 |
| 2010/0091092 A1 * | 4/2010 | Jeong et al. | 348/43 |
| 2010/0119175 A1 * | 5/2010 | Tsang | 382/294 |
| 2010/0272174 A1 * | 10/2010 | Toma | H04N 19/426 375/240.12 |
| 2011/0298895 A1 | 12/2011 | Tian et al. | |
| 2013/0169751 A1 * | 7/2013 | Hattori | H04N 13/0048 348/43 |

FOREIGN PATENT DOCUMENTS

| | | | |
|---|---|---|---|
| JP | 2009-004942 A | 1/2009 | |
| JP | 2015010733 A | 1/2015 | |
| KR | 2010-0032235 A | 3/2010 | |
| KR | 2012020627 A | 3/2012 | |
| WO | WO 2010/010077 A2 | 1/2010 | |
| WO | WO 2010/085361 A2 | 7/2010 | |
| WO | WO2010096189 A1 | 8/2010 | |

OTHER PUBLICATIONS

Korean Office Action dated Mar. 31, 2014 for Application No. 10-2013-7011632, 8 pages.
Office Action dated Dec. 5, 2014 for the corresponding Chinese Patent Application No. 201180054943.7, 12 pages.
Search Report dated Mar. 5, 2015 from corresponding European Patent Application No. 11840984.6, 5 pages.
Notice of Allowance dated Mar. 23, 2015 from corresponding Korean Patent Application No. 10-2013-7011632, 6 pages.
International Search Report dated May 22, 2012 for Application No. PCT/KR2011/008694, with English Translation, 4 Pages.
Supplementary European Search Report dated Jun. 30, 2015 for Application No. EP 11840984, 11 Pages.
Yea S. et al., "View Synthesis Prediction for Multiview Video Coding", Signal Processing. Image Communication, Elsevier Science Publishers, Amsterdam, NL, vol. 24, No. 1-2, Jan. 1, 2009, pp. 89-100, XP025884347, ISSN: 0923-5965, DOI: 10.16/J.IMAGE. 2008.18.007 [retrieved on Oct. 29, 2008] *Chapters 3.2 and 6.1; figure 7 *.

* cited by examiner

View 0 (400)

V0 (410)
D0 (420)

View 1 (430)

V1 (440)
D1 (450)

View 0 (460)

FT (470)
FD (480)

View 1 (490)

BT (493)
BD (496)

METHOD FOR TRANSFORMING FRAME FORMAT AND APPARATUS USING SAME METHOD

CROSS REFERENCE TO RELATED APPLICATIONS

This application is a U.S. National Phase Application under 35 U.S.C. §371 of International Application PCT/KR2011/008694, filed on Nov. 15, 2011, which claims the benefit of U.S. Provisional Application No. 61/413,482, filed on Nov. 15, 2010 and U.S. Provisional Application No. 61/420,755, filed on Dec. 7, 2010, the entire contents of which are hereby incorporated by reference in their entireties.

TECHNICAL FIELD

The present invention relates to a method for converting a frame format and an apparatus using the same, and more particularly, to a video decoding method and apparatus.

BACKGROUND

The multiview video is a new type of multimedia technology that provides a sense of realism and a sense of immersion using multiple view channels. The multiview application is the most general and challenging application model which may be used when expressing, storing, and transmitting three-dimensional (3D) information. The aim of the multiview application is to provide a virtual reality by giving interactivity with media to a user. This technology is expected to be widely applied to 3D movies, realistic broadcasting, entertainment, medical practice, education, sightseeing, culture, remote sensing, and information recording of national treasures or traditional culture. In the case of a free-viewpoint TV, a user can freely manipulate the observed direction and viewpoint of media without one-sidedly accepting the media. Therefore, the free-viewpoint TV may change the media into active media. However, with the increase in the number of viewpoints, various problems occur in acquiring a video, storing and transmitting a video, and playing a video. In particular, when a video is stored and transmitted, a limited storage capacity and an increased channel band serve as the largest obstacles to the multiview video service.

Therefore, the multiview video application requires an encoding technique capable of satisfying high compression efficiency, interactivity with users, various scalabilities such as view scalability and temporal scalability, and random access in viewpoint and temporal directions. Such expectations and requirements are also reflected into standardization of a multiview video compression method of the MPEG-4 3DAV (3D Audio/Video) standardization group, which has started from 2001.

SUMMARY OF INVENTION

Technical Problem

An embodiment of the present invention is directed to a method for transmitting a different video format at an existing video transmission layer.

Another embodiment of the present invention is directed to an apparatus for performing a method for transmitting a different video format at a video transmission layer.

Technical Solution

According to an embodiment of the present invention, a video decoding method includes: decoding an encoded multiview video compression (MVC)-compatible frame using an MVC decoder; and converting the decoded MVC-compatible frame into an advanced 3D frame. The video decoding method may further include performing view synthesis using the advanced 3D frame. The MVC-compatible frame may include a frame which is generated based on color information and depth information of the advanced 3D frame through a frame compatible method. The frame compatible method may include any one of a check board method, a column interleaving method, a row interleaving method, a side-by-side method, and a top and bottom method. The advanced 3D frame may include multiview video plus depth (MVD) data containing color information and depth information and layered depth video (LDV) data containing foreground and background textures and foreground and background depths. In the converting of the decoded MVC-compatible frame into the advanced 3D frame, when the advanced 3D frame is MVD data, color information may be extracted and up-sampled based on first information contained in the MVC-compatible frame, and depth information may be extracted and up-sampled based on second information contained in the MVC-compatible frame. In the converting of the decoded MVC-compatible frame into the advanced 3D frame, when the advanced 3D frame is LDV data, a foreground texture or background texture may be extracted and up-sampled based on first information contained the MVC-compatible frame, and a foreground depth or background depth may be extracted and up-sampled based on second information contained in the MVC-compatible frame. The converting of the decoded MVC-compatible frame into the advanced 3D frame may include decoding information on a frame compatible method used to generate the MVC-compatible frame and converting the MVC-compatible frame into the advanced 3D frame based on the decoded information.

According to another embodiment of the present invention, a video decoding method includes: decoding position information of a blank coding block in which coding is not performed; and performing decoding in a coding block based on the position information. The decoding of the position information may include decoding blank map information on whether or not decoding is performed in a coding block included in a corresponding slice and decoding the position information of the blank coding block in which coding is not performed, based on the blank map information. The video decoding method may further include determining whether or not to perform blank coding in a sequence based on information on whether blank coding is performed or not, the information being stored in a sequence parameter set (SPS) block; and when blank coding is performed in the sequence, determining whether or not to perform blank coding in a slice.

According to another embodiment of the present invention, a video encoding apparatus includes: a down-sampling unit configured to down-sample color information and depth information; and a frame synthesizing unit configured to synthesize the color information and the depth information, which are down-sampled by the down-sampling unit, into one MVC-compatible frame. The frame synthesizing unit may generate information on a frame compatible method used to generate the MVC-compatible frame.

According to another embodiment of the present invention, a video decoding apparatus includes: a frame separation unit configured to separate an MVC-compatible frame into one or more pieces of color information and one or more pieces of depth information; and an up-sampling unit configured to up-sample the color information and the depth information separated by the frame separation unit. The frame separation unit may separate the MVC-compatible frame based on the information on the frame compatible method used to generate the MVC-compatible frame.

Advantageous Effects

According to the embodiments of the present invention, the method for converting a frame format and the apparatus using the same may transmit advanced 3D video through an existing MVC encoder/decoder. Therefore, advanced 3D contents may be utilized without changing an existing transmission system and a communication layer.

MODE FOR INVENTION

Figure 1:
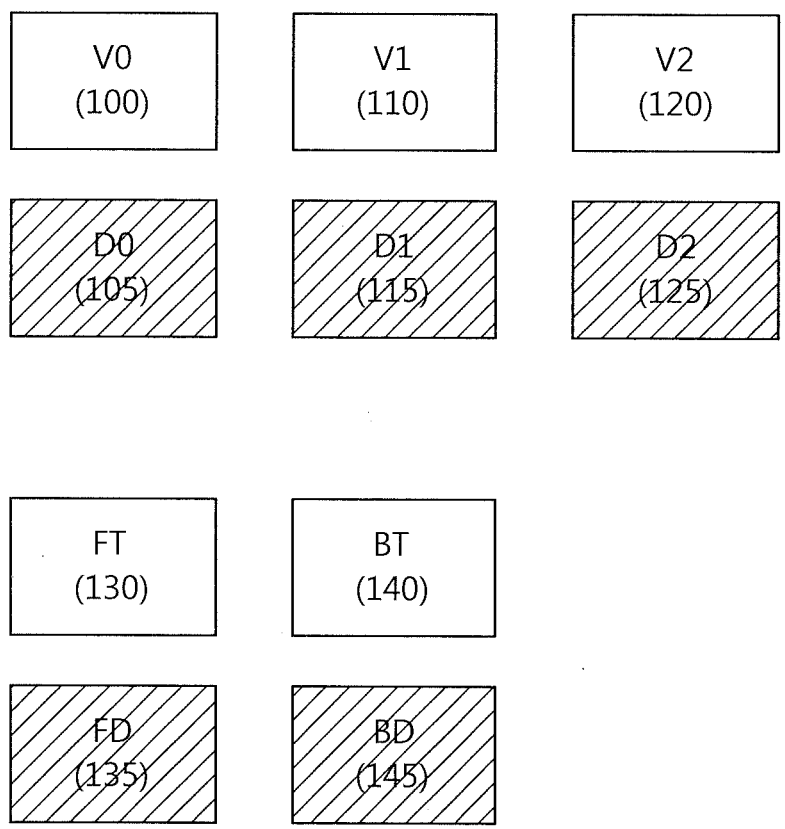
FIG. 1 is a conceptual diagram illustrating advanced 3D contents according to an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

When an element is referred to as being "connected" or "coupled" to another element, it should be understood that the elements may be directly connected or coupled to each other, but another element may be interposed therebetween. Furthermore, when a specific element is referred to as being "included", elements other than the corresponding element are not excluded, but additional elements may be included in embodiments of the present invention or the scope of the present invention.

Terms such as first and second may be used to describe various elements, but the elements must not be limited to the terms. The terms are used only to distinguish one element from other elements. For example, a first element may be referred to as a second element, and the second element may be referred to as the first element, without departing from the scope of the invention.

Furthermore, constituent units included in embodiments of the present invention are independently illustrated to describe different specific functions, and each of the constituent units may not indicate separate hardware or one software element. That is, the respective constituent units are arranged and included for convenience of description. Among the constituent units, two or more constituent units may be combined to serve as one constituent unit, and one constituent unit may be divided into a plurality of constituent units to perform a function. The integrated embodiment of the constituent units and the divided embodiments of each constituent unit are included in the claims as long as they do not depart from the spirit of the present invention.

Furthermore, some elements may not serve as necessary elements to perform an essential function in the present invention, but may serve as selective elements to improve performance. The present invention may be embodied by including only necessary elements to implement the spirit of the present invention excluding elements used to improve performance, and a structure including only necessary elements excluding selective elements used to improve performance is also included in the scope of the present invention.

FIG. 1 is a conceptual diagram illustrating advanced 3D contents according to an embodiment of the present invention.

Advanced 3D contents refer to frame contents containing depth information in color information. The advanced 3D method may play a 3D video with a sense of depth by synthesizing videos at the position of an arbitrary view utilizing video information and depth information which are transmitted during a playing process. When the advanced 3D method is used, a viewer may adjust the sense of depth, and a multi-view display device may naturally synthesize a necessary number of views at successive viewpoints.

The top of FIG. 1 illustrates a multiview video plus depth (MVD) format of the advanced 3D method.

The top of FIG. 1 illustrates a MVD format in a case in which the number of views is three. The MVD format may have first color information 100, second color information 200, and third color information 300, first depth information 105, second depth information 115, and third depth information 125. The first depth information 105, the second depth information 115, and the third depth information 125 correspond to the first color information 100, the second color information 200, and the third color information 300, respectively. That is, in the case of the MVD method, color information and depth information corresponding to the color information may be generated, depending on a view.

The bottom of FIG. 1 illustrates a layered depth video (LDV) format of the advanced 3D method.

Referring to the bottom of FIG. 1, the LDV format may include a foreground texture (FT) 130, a background texture (BT) 140, a foreground depth (FD) 135 having depth information on the foreground texture 130, and a background depth (BD) 145 having depth information on the background texture 140.

A video contents transmission method according to an embodiment of the present invention may transmit advanced 3D contents such as MVD and LDV using a multiview video compression (MVC) method, and advanced 3D contents represented in the form of MVC frame may be defined as an MVC-compatible frame so as to be encoded/decoded by an MVC encoder or MVC decoder.

Figure 2:
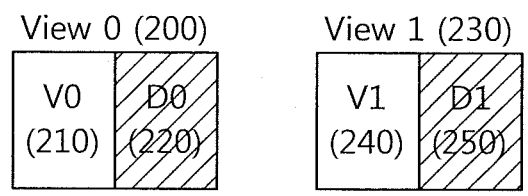
FIG. 2 is a conceptual view illustrating a method for converting advanced 3D contents based on an MVD format into an MVC-compatible frame.
Figure 3:
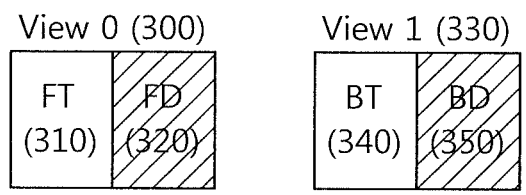
FIG. 3 is a conceptual view illustrating a method for converting advanced 3D contents based on an LDV format into an MVC-compatible frame.

FIGS. 2 and 3 are conceptual views illustrating an advanced 3D contents display method according to another embodiment of the present invention.

FIG. 2 is a conceptual view illustrating a method for converting advanced 3D contents based on the MVD format into an MVC-compatible frame.

When the number of views is two in the MVD method, a side-by-side method may be used to generate first color information 210 and first depth information 220 as a first MVC compatible frame 200 and generate second color information 240 and second depth information 250 as a second MVC-compatible frame 230. The first and second MVC-compatible frames 200 and 230 may be encoded/decoded together by an MVC encoder and an MVC decoder.

FIG. 3 is a conceptual view illustrating a method for converting advanced 3D contents based on the LDV format into an MVC-compatible frame.

The side-by-side method may be used to generate a foreground texture 310 and a foreground depth 320 which are acquired according to the LDV method as a first MVC-compatible frame 300, and generate a background texture 340 and a background depth 350 as a second MVC-compatible frame 330. The generated first and second MVC-compatible frames 300 and 330 may be encoded/decoded together through an MVC encoder and an MVC decoder.

Figure 4:
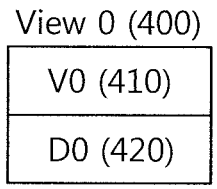
FIG. 4 is a conceptual view illustrating an advanced 3D contents display method according to another embodiment of the present invention.
Figure 4:
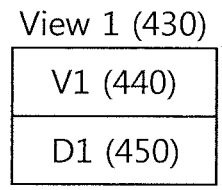
Figure 4:
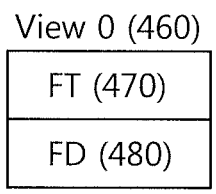
Figure 4:
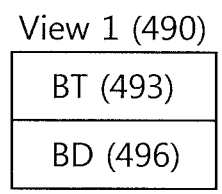

FIG. 4 is a conceptual view illustrating an advanced 3D contents display method according to another embodiment of the present invention.

FIG. 4 illustrates a method for converting advanced 3D contents into an MVC-compatible frame according to a top-bottom method.

Referring to the top of FIG. 4, for advanced 3D contents based on MVD method, the top-down method may be used to generate first color information 410 and first depth information 420 as a first MVC-compatible frame 400, and generate second color information 440 and second depth information 450 a second MVC-compatible frame 430. The first and second MVC-compatible frames 400 and 430 may be encoded/decoded together through an MVC encoder and an MVC decoder.

Referring to the bottom of FIG. 4, the top-down method may be used to generate a foreground texture 470 and a foreground depth 480, which are acquired according to the LDV method, as a first MVC-compatible frame 460 and generate a background texture 493 and a background depth 496 as a second MVC-compatible frame 490. The generated first and second MVC-compatible frames 460 and 490 may be encoded/decoded together through an MVC encoder and an MVC decoder.

Figure 5:
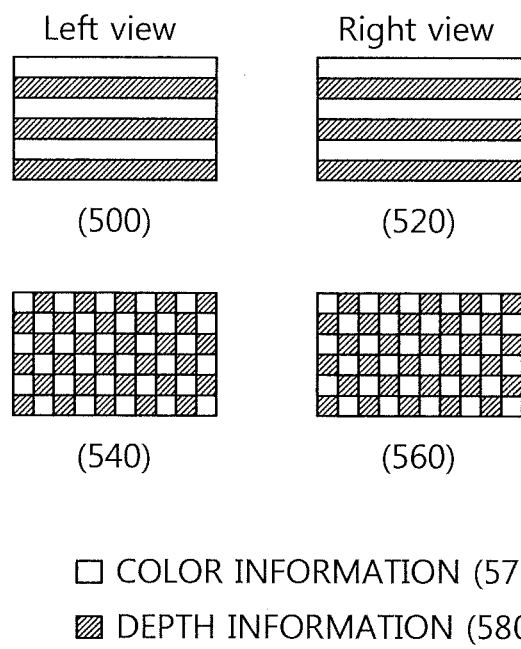
FIG. 5 is a conceptual view illustrating a method for displaying advanced 3D contents as a MVC-compatible frame according to another embodiment of the present invention.

FIG. 5 is a conceptual view illustrating a method for displaying advanced 3D contents as a MVC-compatible frame according to another embodiment of the present invention.

Referring to FIG. 5, an interlaced method or check box method may be additionally used as the MVC-compatible frame display method.

In the interlaced method 500 and 520 and the check box method 540 and 560, color information and depth information may be generated into one piece of frame information to generate a MVC-compatible frame, like the side-by-side method and the top and down method. That is, in the case of advanced 3D contents based on the MVD format, an MVC-compatible frame may be generated based on color information 570 and depth information 580, and in the case of advanced 3D contents based on the LVD format, an MVC-compatible frame may be generated based on foreground and background textures 570 and foreground and background depths 580. In the interlaced method 500 and 520 and the check box method 540 and 560, first information contained in the frame may serve as color information, and second information may serve as depth information.

In addition to the above-described frame compatible methods, a method for displaying two pieces of information as one frame, for example, a method for displaying advanced 3D contents as one piece of information may be used to generate an MVC-compatible frame. Such an embodiment is included in the scope of the present invention.

The advanced 3D contents which are represented in the form of an MVC frame to be encoded/decoded by an MVC encoder or MVC decoder may be defined as an MVC-compatible frame, and the MVC-compatible frame may be represented by down-sampling the resolutions of video information and depth information of original advanced 3D contents. The down-sampled video may be generated as or transformed into a video of which the resolution is up-sampled to the original resolution through a decoding process.

Hereafter, in the embodiments of the present invention, a method for performing MVC encoding/decoding based on two frames will be described for convenience of description. However, the MVC encoding/decoding may be performed based on plural pieces of video information, and may encode/decode a plurality of videos using temporal similarity and inter-view similarity based on a matrix of picture (MOP). That is, the MVC encoding/decoding may be performed based on a plurality of frames. Therefore, plural pieces of video information may be generated depending on the advanced 3D method, and two or more MVC-compatible frames may be generated based on the video information. Furthermore, the MVC encoding/decoding may be performed based on the MVC-compatible frames.

Figure 6:
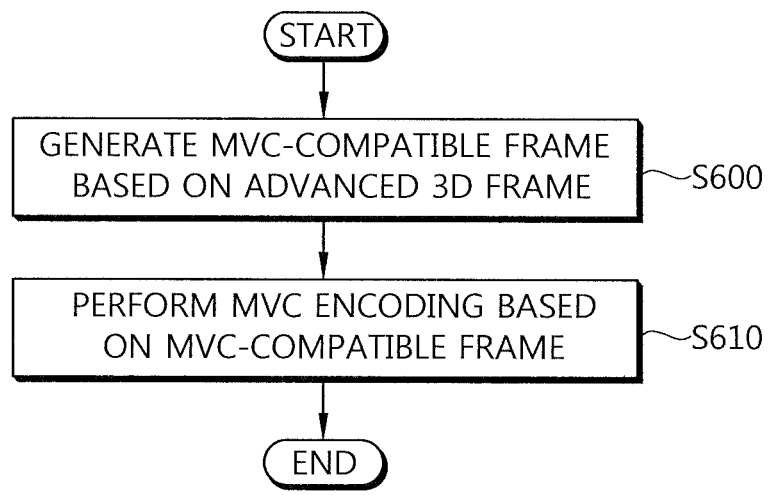
FIG. 6 is a flowchart illustrating a method for converting advanced 3D contents based on the MVD format into an MVC-compatible frame according to another embodiment of the present invention.

FIG. 6 is a flowchart illustrating a method for converting advanced 3D contents based on the MVD format into an MVC-compatible frame according to another embodiment of the present invention.

Referring to FIG. 6, an MVC-compatible frame is generated based on an advanced 3D frame at step S600.

In the case of the MVD format, a first MVC-compatible frame may be generated based on first color information and first depth information, and a second MVC-compatible frame may be generated based on second color information and second depth information. In the case of the LDV format, first and second MVC-compatible frames may be generated based on foreground textures and foreground depths. In order to convert advanced 3D contents into an MVC-compatible frame as described above, various compatible frame methods such as the side-by-side method, the top-down method, the interlaced method, and the check box method may be used to generate the MVC compatible method. The MVC-compatible frame may be generated by down-sampling the resolutions of original video information and depth information according to the method for generating an MVC-compatible frame.

Based on the MVC-compatible frame, MVC encoding is performed at step S610.

The MVC encoding may encode video information and depth information of a frame based on spatial similarity or temporal similarity among a plurality of frames or may be performed using an MVC-compatible frame generated on the basis of a frame compatible method.

Figure 7:
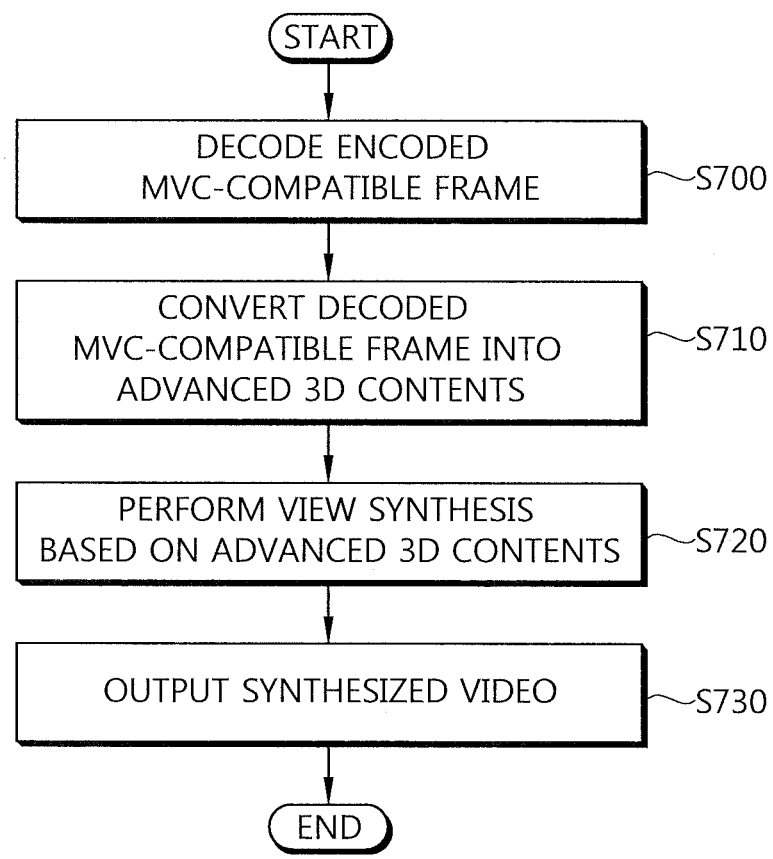
FIG. 7 is a flowchart illustrating a method for decoding an MVC-compatible frame into advanced 3d contents based on the MVD format according to another embodiment of the present invention.

FIG. 7 is a flowchart illustrating a method for decoding an MVC-compatible frame into advanced 3d contents based on the MVD format according to another embodiment of the present invention.

Referring to FIG. 7, an encoded MVC-compatible frame is decoded at step S700.

The MVC-compatible frame encoded through an MVC encoder may be decoded by an MVC decoder.

The decoded MVC-compatible frame is converted into advanced 3D contents at step S710.

Video information based on the MVD or LDV format may be decoded into original advanced 3D contents based on the decoded MVC compatible frame. For example, in the case of the MVD format, the MVC-compatible frame may be converted into plural pieces of color information and depth information, and in the case of the LVD format, the MVC-compatible frame may be converted into a frame containing a plurality of foreground textures and depths and a plurality of background textures and depths.

In order to convert the decoded MVC-compatible frame into the original advanced 3D frame, color information and depth information may be up-sampled. In order to convert the decoded MVC-compatible frame into an advanced 3D frame, information on the frame compatible method such as the side-by-side method or the top and bottom method used to convert the advanced 3D contents into the MVC-compatible frame may be received. Based on the received information, the original advance 3D contents may be generated.

View synthesis is performed based on the advanced 3D contents at step S720.

The color information and the depth information contained in the advanced 3D frame may be used to generate a plurality of virtual views depending on the display method. That is, the plurality of virtual views may be generated through multiview rendering, based on two pieces of video information and depth information.

The synthesized video is outputted at step S730.

The video based on the advanced 3D contents may be outputted through a 3D display device.

Figure 8:
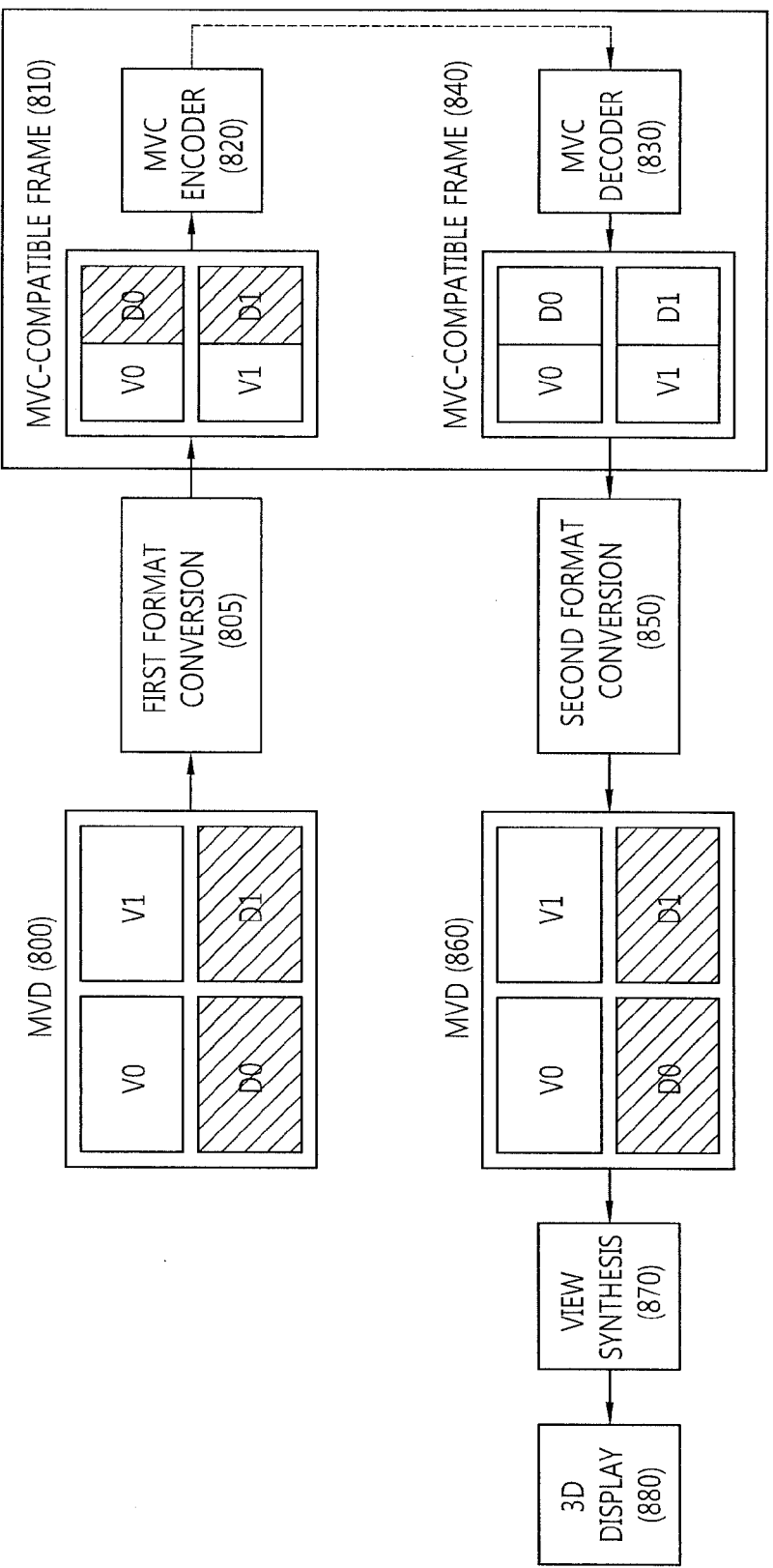
FIG. 8 is a conceptual view illustrating a method for encoding/decoding an advanced 3D frame through an MVC encoder or MVC decoder according to another embodiment of the present invention.

FIG. 8 is a conceptual view illustrating a method for encoding/decoding an advanced 3D frame through an MVC encoder or MVC decoder according to another embodiment of the present invention.

FIG. 8 illustrates a method for encoding/decoding advanced 3D contents based on the MVD format including depth information and video information, but the method may be applied to other advanced 3D contents.

Referring to FIG. 8, first format conversion 805 may be performed on an MVD video 800 including first color information, first depth information, second color information, and second depth information.

The first format conversion 805 is a method for converting advanced 3D contents such as MVD or LDV into an MVD-compatible frame, and may include various methods such as a side-by-side method, a top-down method, an interlaced method, and a check box method. Through the first format conversion 805, the resolution of color information or depth information may be down-sampled to generate one frame, depending on the frame compatible method.

The MVC-compatible frame 810 generated through the first format conversion 805 may include color information and depth information at the same time, and a plurality of MVC-compatible frames 810 may be encoded by an MVC encoder 820.

The encoded MVC-compatible frame may be decoded by an MVC decoder 830, and second format conversion 850 may be performed on the decoded MVC-compatible frame 840 according to the opposite procedure of the encoding procedure. Through the second format conversion 850, the frame down-sampled by the first format conversion 805 may be up-sampled to generate the original video. That is, the video information and the depth information, which have been down-sampled and represented as one frame, may be decoded into plural pieces of video information and depth information through the second format conversion 850.

The MVC-compatible frame 840 may be converted into advanced 3D contents 860 by the second format conversion 850. The format converted video information and depth information may be used to synthesize arbitrary virtual view images through view synthesis 870. For the advanced 3D contents, warping into a plurality of viewpoints may be performed based on the depth information. Therefore, a plurality of successive virtual views may be synthesized.

The synthesized video may be played by a 3D display device 880.

Figure 9:
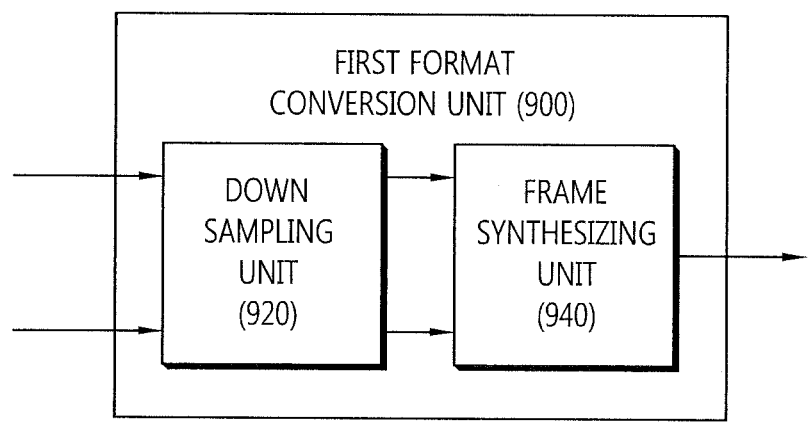
FIG. 9 is a conceptual view illustrating a first format conversion unit used to perform encoding according to the embodiment of the present invention.

FIG. 9 is a conceptual view illustrating a first format conversion unit used to perform encoding according to the embodiment of the present invention.

Referring to FIG. 9, the first format conversion unit 900 may include a down-sampling unit 920 and a frame synthesizing unit 940.

The down-sampling unit 920 may reduce the resolution of color information or depth information in a horizontal or vertical direction depending on the frame compatible method. For example, when the frame compatible method is a side-by-side method, the horizontal resolution of a frame containing color information may be reduced to the half, and the horizontal resolution of a frame containing depth information may be reduced to the half. When the frame compatible method is a top and down method, the vertical resolution of a frame containing color information may be reduced to the half, and the vertical resolution of a frame containing depth information may be reduced to the half.

The frame synthesizing unit 940 may synthesize frames down-sampled through the down sampling unit 920 into one frame. For example, when the frame compatible method is a side-by-side method, the frame synthesizing unit 940 may synthesize a color information frame and a depth information frame, which are down-sampled, into one MVC-compatible frame. The generated MVC-compatible frame may be provided to an MVC encoder and encoded by the MVC encoder. The frame synthesizing unit 940 may generate information on the frame compatible method used to generate the MVC-compatible frame, and the information on the frame compatible method used to generate the MVC-compatible frame may be encoded by the MVC encoder.

Figure 10:
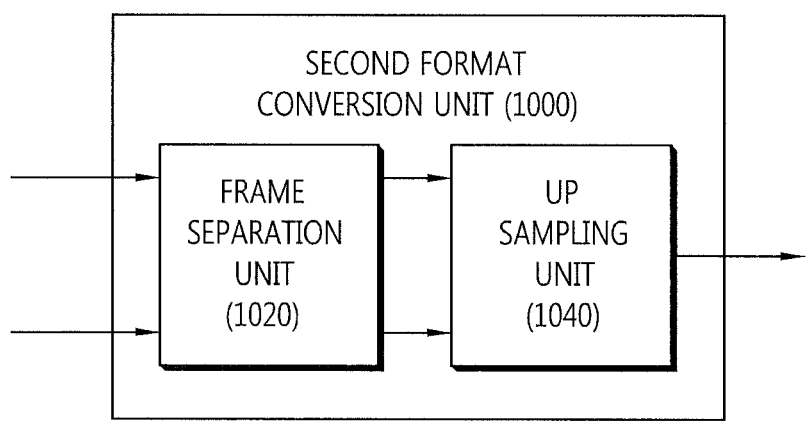
FIG. 10 is a conceptual view illustrating a second format conversion unit used to perform decoding according to the embodiment of the present invention.

FIG. 10 is a conceptual view illustrating a second format conversion unit used to perform decoding according to the embodiment of the present invention.

Referring to FIG. 10, the second format conversion unit 1000 may include a frame separation unit 1020 and an up-sampling unit 1040.

The frame separation unit 1020 may generate two frames based on one decoded MVC-compatible frame. For example, since one MVC-compatible frame includes one color information frame and one depth information frame which are down-sampled, the frame separation unit 1020 may separate the MVC-compatible frame into the color information frame and the depth information frame based on information on a frame compatible method used to generate the MVC-compatible frame.

The frame separation unit 1020 may receive information on the frame compatible method used to generate a current MVC-compatible frame based on frame compatible information decoded by an MVC decoder, and separate the frame into original advanced 3D contents based on the received information.

The up-sampling unit 1040 may up-sample the frames separated by the frame separation unit 1020. The frames separated by the frame separation unit 1020 are frames which are down-sampled and synthesized by the first format conversion unit, and may have a resolution reduced to the half. Therefore, in order to increase the resolution of the frame, the up-sampling unit 1040 may perform up-sampling to reconstruct original advanced 3D contents.

Table 1 shows syntax elements for performing the video information representation method according to the embodiment of the present invention. Information corresponding to the syntax elements may be added to an MVC SEI message so as to represent a method for generating current video information.

TABLE 1

| Syntax elements | Symantics |
|---|---|
| Frame_packing_arrangement_type | Indicate frame packing method. for example) 0 checker board 1 column interleaving 2 row interleaving 3 side-by-side 4 top and bottom |
| Advanced_3d_data_type | Indicate frame-packed advanced 3D data format. When 0, MVD method, and when 1, LDV method. |

A syntax element frame_packing_arrangement_type may indicate information on a method for packing a frame. As described above, an index (0: check board, 1: column interleaving, 2: row interleaving, 3: side-by-side, and 4: top and bottom) is mapped to a method for converting advanced 3D contents into an MVC-compatible frame. Based on the mapping information, it is possible to determine by which frame packing method a current MVC-compatible frame was packed.

A syntax element advanced_3d_data_type may indicate information on whether a frame-packed advanced 3D video is based on the MVD format or LDV format.

Table 2 below shows a syntax structure, and the syntax elements frame_packing_arrangement_type and advanced_3d_data_type may be represented in frame_packing_arrangement_info(payloadsize).

TABLE 2

```
frame_packing_arrangement_info( payloadSize ) {
    frame_packing_arrangement_type
    advanced3d_data_type
}
```

The above-described syntax element information indicates information for representing a frame packing type and an advanced 3D data format, and the syntax element information and a meaning corresponding to the syntax element information may be represented in different manners. Furthermore, the syntax element information may be separately used or coupled to another syntax element.

The MVD format may include video information and depth information taken at various views. When the MVD format is used, video information and depth information at one point on a 3D space may be represented to overlap video information and depth information of a plurality of views. In order to remove duplicate video information during encoding and acquire video information and depth information which are not represented in other views, a residual depth video (RDV) method may be used. In the case of an RDV data format, duplicate data are removed during encoding, and only video information and depth information which are not represented in other views are left. Therefore, a block overlapping other views becomes a blank block where data to encode do not exist. Therefore, when data is transmitted to a position of the blank block, encoding/decoding for the corresponding block may not be performed. Accordingly, the complexity of the encoding/decoding may be decreased, and the efficiency of the encoding/decoding may be increased. Hereinafter, an encoding method used for the RDV data format is referred to as a blank coding method.

Table 3 shows a syntax element indicating whether or not to perform blank coding in a corresponding sequence according to another embodiment of the present invention.

TABLE 3

```
seq_parameter_set_data( ) {
    ...
    enable_blank_flag
    ...
}
```

In Table 3, a syntax element enable_blank_flag may be used in a sequence parameter set (SPS) level so as to determine whether a current sequence is data based on the RDV format in which blank coding is performed or data based on the MVD format in which blank coding is not performed. For example, when the syntax element enable_blank_flag is 1, the current sequence may be determined to be RDV data, and when the syntax element enable_blank_flag is 0, the current sequence may be determined to be MDV data.

At a slice level, it is possible to indicate whether or not to use black coding for each slice.

Table 4 below indicates a syntax element to indicate whether or not to use blank coding for each slice according to the embodiment of the present invention.

TABLE 4

```
slice_header ( ) {
    ...
    if( enable_blank_flag ) {
        use_blank_flag
    }
    ...
}
```

Referring to Table 4, when it is determined through the syntax element enable_blank_flag in the SPS level that blank coding is used in the current sequence, a new syntax element use_blank_flag may be used to determine whether or not to use black coding in slice unit. When the syntax element enable_blank_flag is 0, the syntax element use_blank_flag may be estimated as 0.

Table 5 shows whether or not a current coding unit is a blank coding unit in which coding is not performed.

TABLE 5

```
slice_data ( ) {
    ...
    do {
        if( use_blank_flag )
            blank_flag
        if( !blank_flag ) {
            if( slice_type !=I && slice_type != SI ) {
                ...
            }
        }
        CurrentMbAddr = NextMbAddr( CurrMbAddr )
    } while( moreDataFlag )
}
```

Referring to FIG. 5, a new syntax element blank_flag may be used to indicate whether or not to perform blank coding in a coding unit.

At a coding unit level, the syntax element blank_flag may indicate whether or not information to encode exists in a current coding unit. When the syntax element use_blank_flag is 0, the syntax element blank_flag may be estimated as 0.

The syntax elements described in Tables 3 to 5 are embodiments to represent information on whether or not to perform encoding in a sequence, slice, and coding block, and syntax elements for performing blank coding may be represented in various manners. For example, when blank coding is unconditionally performed at the sequence level, the syntax element enable_blank_flag described with reference to Table 3 may not be used. Accordingly, the syntax elements of Tables 4 and 5 may be represented in different manners.

Figure 11:
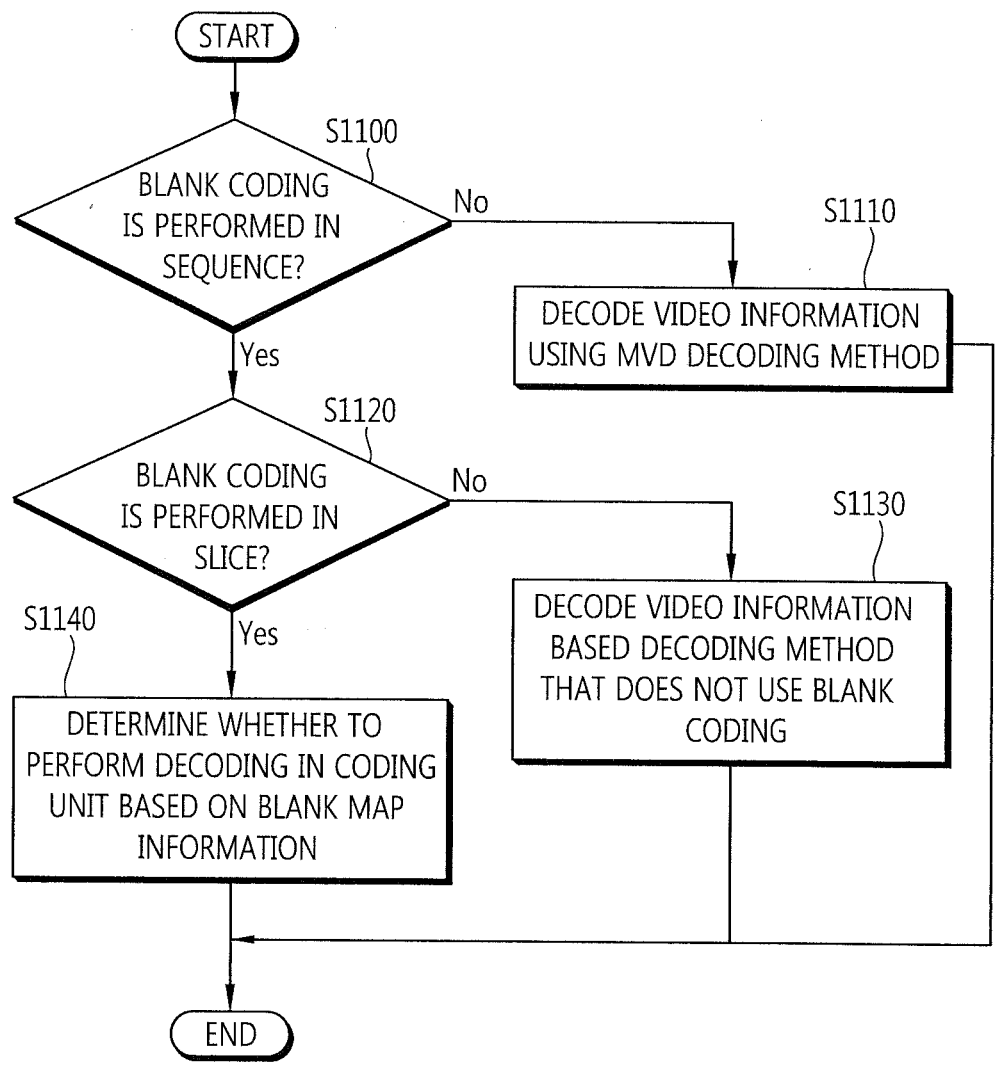
FIG. 11 is a flowchart illustrating a method for decoding information on whether or not to perform blank coding according to another embodiment of the present invention.

FIG. 11 is a flowchart illustrating a method for decoding information on whether or not to perform blank coding according to another embodiment of the present invention.

Referring to FIG. 11, whether or not blank coding is performed in a current sequence is determined at step S1100.

As described with reference to Table 3, it may be determined through the enable_blank_flag information included in the SPS that blank coding is performed in the current sequence.

When blank coding is not performed, a general MVD decoding process may be performed at step S1110.

Information on whether or not blank coding is performed in a current slice at the slice level is decoded at step S1120.

When it is determined that blank coding is performed at the sequence level, whether or not blank coding is performed in the current slice at the slice level may be determined.

When blank coding is not performed in the current slice, decoding may be performed in the slice through a general decoding process at step S1130.

When blank coding is performed in the current slice, it is possible to generate a 2D-array blank map corresponding to map information for indicating whether or not blank coding is performed in a coding block included in the corresponding slice. In the blank map, the information on whether or not to perform blank coding may be reset to 0.

Based on the blank map, whether or not to perform decoding in a coding block is determined at step S1140.

When the syntax element blank_flag for determining whether or not to perform blank coding in a current coding unit is 1, encoding for the corresponding coding unit may not be performed, and 1 is written into BlankMap[x][y] so as to indicate that encoding is not performed in the current coding unit. Furthermore, a coding unit in which coding is not performed since it is blanked may be not used as a reference block in performing inter picture prediction or intra picture prediction for neighboring coding units. When the syntax element blank_flag is 0, encoding may be performed on the corresponding coding unit.

FIG. 11 is based on the blank coding method described with reference to Tables 3 to 5, and another blank coding method may be used as long as the method does not depart from the spirit of the present invention. For example, the step of determining whether or not blank coding is not performed in the corresponding sequence at the sequence level may not be performed.

While the present invention has been described with respect to the specific embodiments, it will be apparent to those skilled in the art that various changes and modifications may be made without departing from the spirit and scope of the invention as defined in the following claims.

The invention claimed is:

1. A video decoding method comprising:
   decoding an encoded multiview video compression (MVC)-compatible frame using an MVC decoder; and
   converting the decoded MVC-compatible frame into an advanced 3D frame,
   wherein the converting of the decoded MVC-compatible frame into the advanced 3D frame comprises decoding information on a frame compatible method used to generate the MVC-compatible frame and converting the MVC-compatible frame into the advanced 3D frame based on the decoded information.

2. The video decoding method of claim 1, further comprising performing view synthesis using the advanced 3D frame.

3. The video decoding method of claim 1, wherein the MVC-compatible frame comprises a frame which is generated based on color information and depth information of the advanced 3D frame through the frame compatible method.

4. The video decoding method of claim 3, wherein the frame compatible method comprises any one of a check board method, a column interleaving method, a row interleaving method, a side-by-side method, and a top and bottom method.

5. The video decoding method of claim 1, wherein the advanced 3D frame comprises multiview video plus depth (MVD) data containing color information and depth information or layered depth video (LDV) data containing foreground and background textures and foreground and background depths.

6. The video decoding method of claim 1, wherein, in the converting of the decoded MVC-compatible frame into the advanced 3D frame,
   when the advanced 3D frame is MVD data, color information is extracted and up-sampled based on first information contained in the MVC-compatible frame, and depth information is extracted and up-sampled based on second information contained in the MVC-compatible frame.

7. The video decoding method of claim 1, wherein, in the converting of the decoded MVC-compatible frame into the advanced 3D frame,
   when the advanced 3D frame is LDV data, a foreground texture or background texture is extracted and up-sampled based on first information contained in the MVC-compatible frame, and a foreground depth or background depth is extracted and up-sampled based on second information contained in the MVC-compatible frame.

8. A video decoding method comprising:
   decoding position information of a blank coding block in which coding is not performed; and
   performing decoding in a coding block based on the position information,
   wherein the decoding of the position information comprises decoding blank map information on whether or not decoding is performed in a coding block included in a corresponding slice and decoding the position information of the blank coding block in which coding is not performed, based on the blank map information.

9. The video decoding method of claim 8, wherein the decoding of the position information comprises:
   obtaining enable blank flag information that indicates whether a current sequence is residual depth video (RDV) data format in which blank coding is performed or not;
   obtaining use bank flag information indicating whether the blank coding is used in a slice unit in the current sequence or not when the enable flag information indicates that the blank coding is performed in the current sequence;
   obtaining blank flag information indicating whether the blank coding is performed in a coding unit in the slice unit when the use blank flag information indicates that the bank coding is used in the slice unit; and
   generating the blank map indicating whether the blank coding is performed in each of coding units in the slice unit.

10. The video decoding method of claim 8, further comprising:
   determining whether or not to perform blank coding in a sequence based on information on whether blank coding is performed or not, the information being stored in a sequence parameter set (SPS) block; and
   when blank coding is performed in the sequence, determining whether or not to perform blank coding in a slice.

* * * * *